Figure 1:
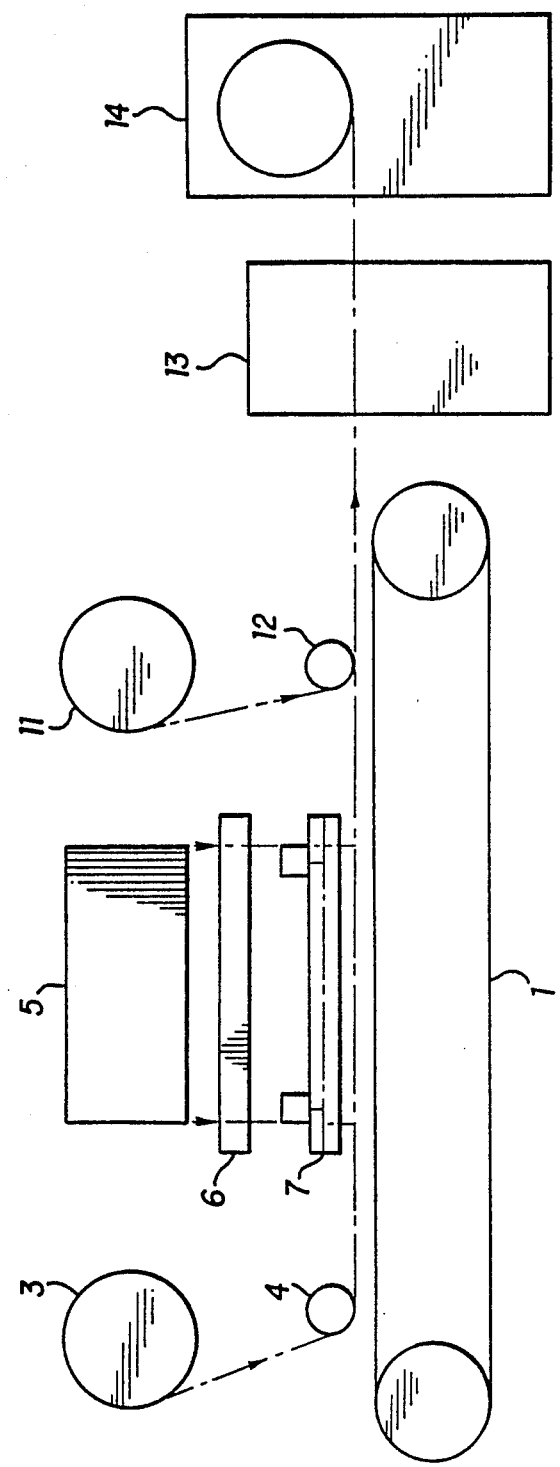

United States Patent [19]
Vittone et al.

[11] Patent Number: 4,933,039
[45] Date of Patent: Jun. 12, 1990

[54] RETICULAR STRUCTURES HAVING IMPROVED MECHANICAL CHARACTERISTICS AS WELL AS PROCESS AND DEVICE FOR PREPARING SAME

[75] Inventors: Andrea Vittone, Milan; Guiseppe Chiappini, Massa Carrara, both of Italy

[73] Assignee: Moplefan S.p.A., Milan, Italy

[21] Appl. No.: 386,723

[22] Filed: Jul. 31, 1989

Related U.S. Application Data

[62] Division of Ser. No. 859,494, May 5, 1986, Pat. No. 4,861,639.

[30] Foreign Application Priority Data

May 7, 1985 [IT] Italy ................................ 20595 A/85

[51] Int. Cl.⁵ ............................................. B32B 5/00
[52] U.S. Cl. .................................... 156/177; 156/179; 156/244.11; 156/308.2; 264/258
[58] Field of Search ...................... 264/DIG. 57, 258; 156/177, 179, 244.11, 308.2

[56] References Cited

U.S. PATENT DOCUMENTS 4,242,407 12/1980 Byen ................................ 428/247
4,297,409 10/1981 Hammant ........................ 428/255
4,344,804  8/1982 Byen et al. ...................... 428/288
4,373,981  2/1983 Bimers et al. ................... 428/247

Primary Examiner—James J. Bell
Attorney, Agent, or Firm—Stevens, Davis, Miller & Mosher

[57] ABSTRACT

Reticular structures comprising one or more fibrillated films perpendicularly arranged between two or more fibrillated films are prepared by a process comprising the steps of: feeding one or more fibrillated films onto a conveyor; feeding one or more transversal films perpendicularly to the conveyor feed direction; cutting such transversal films in position corresponding to the edges of the base film or films; suporposing to said transversal films one or more fibrillated films fed parallelly to the conveyor feed direction and causing the cohesion of the resulting composite structure.

The device for producing such reticular structures is described too.

3 Claims, 2 Drawing Sheets

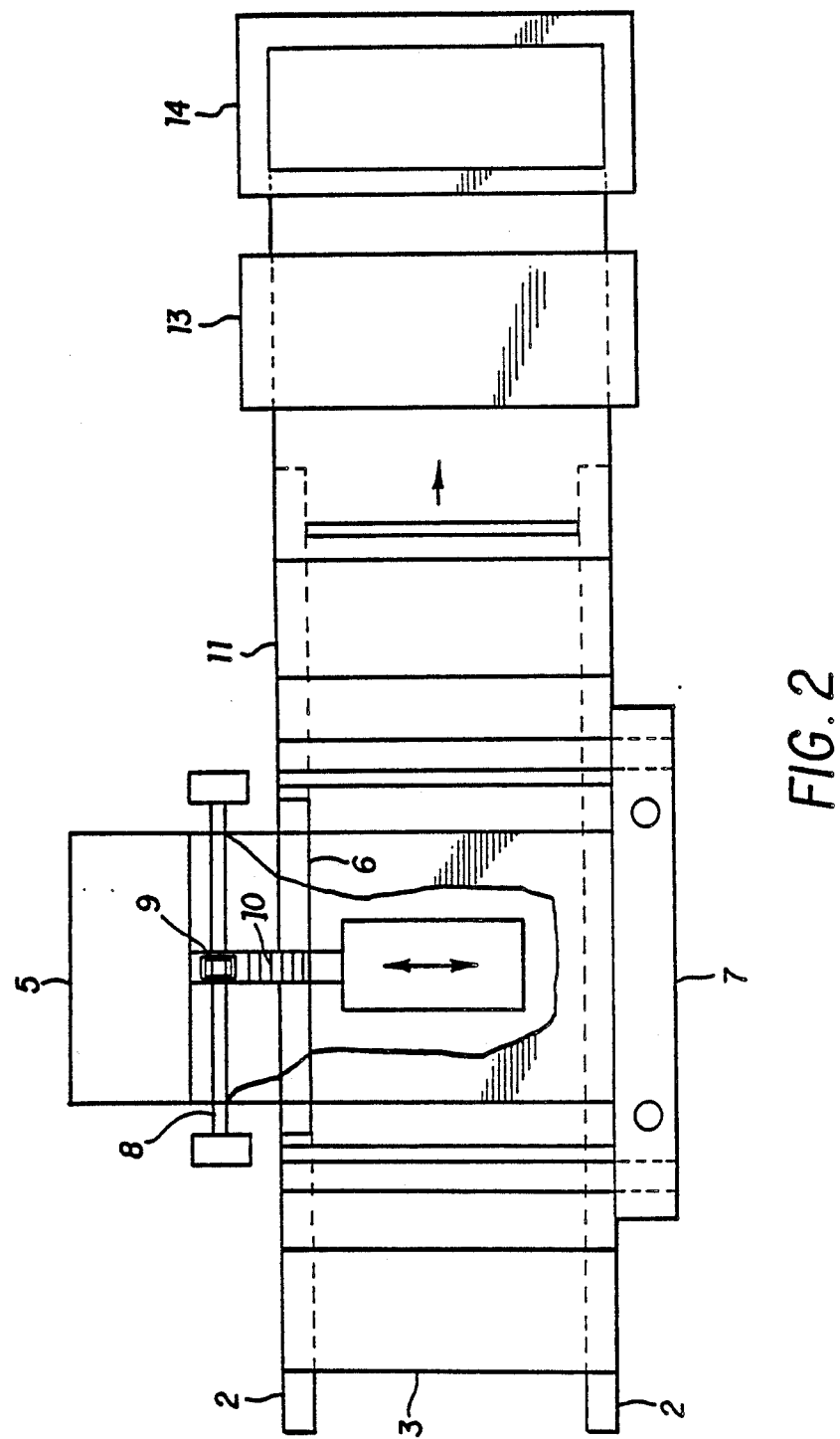

RETICULAR STRUCTURES HAVING IMPROVED MECHANICAL CHARACTERISTICS AS WELL AS PROCESS AND DEVICE FOR PREPARING SAME

This is a division of application Ser. No. 859,494, filed May 5, 1986 now U.S. Pat. No. 4,861,639.

FIELD OF THE INVENTION

The present invention relates to reticular structures consisting of fibrillated films endowed with improved mechanical characteristics and to the process and device for obtaining them.

More in particular, the present invention relates to reticular structures consisting of fibrillated films and having a high mechanical strength in both the longitudinal and the transversal direction.

BACKGROUND OF THE INVENTION

The reticular structures composed by fibrillated films are utilized for reinforcing composite materials having matrices consisting of hydraulic binders (such as e.g. concrete or calcium sulphate) or polymeric matrices (such as e.g. the elastomeric polymers or the unsaturated polymeric resins) and they can be used also as products for the reinforcement of road surfaces or as geotextile products for the reinforcement of grounds.

Such reticulated structures, obtained by means of fibrillation of polymeric films, are well known in the art. These structures are obtained by stretching, according to the extrusion direction, the polymeric films and by successively slitting the monostretched films by means of suitable cutting devices or other slitting means such as sandblasting, brushing, rubbing, etc., in order to cause the formation of a series of longitudinal, parallel, spaced slits, which, due to the subsequent expansion of the film, give rise to the net.

The retiform product thus obtained exhibits, however, the serious drawback of a quite different mechanical strength in the various directions. Actually, such structures exhibit a high mechanical strength in the stretch direction and a low and in any case unsatisfactory mechanical strength in the direction transversal to the stretch direction.

To avoid this drawback it was also suggested to superpose different retiform structures arranged at different angles to one another, or to superpose different retiform structures which have been stretched, fibrillated and splitted at different angles.

Furthermore it was proposed to zigzag-fold a retiform structure on one or more retiform containment structures. Even by increasing the number of zigzag-arranged layers, the resulting composite structure exhibits an unsatisfactory mechanical strength in the various directions due to the considerable discontinuity of the structure resulting from the layer-like arrangement of the retiform structure on the moving basic structure.

Moreover, the zigzag arrangement cannot give rise to structures having a high transversal strength with respect to the longitudinal strength, wherefore it is very limitative with regard to the appliances.

THE PRESENT INVENTION

Thus, the object of the present invention is to prepare a reticular structure not affected by the abovesaid shortcomings.

More in particular, the object of the present invention is that of preparing a reticular structure for reinforcing britle manufactured articles, which exhibits a balanced mechanical strength in the longitudinal and transversal directions.

A further object of the invention in that of providing a device which permits to obtain, with industrially acceptable capacities, reticular structures having balanced mechanical strengths in the longitudinal and transversal directions.

Still a further object of the present invention is that of providing a process which permits to obtain such reticular structures.

According to an aspect of the present invention these and other objects are achieved by means of a reticular structure comprising a first layer of one or more longitudinal fibrillated films; a second layer of one or more fibrillated films superposed to the first one and arranged in such way that the extrusion and stretching direction of the films may be perpendicular to the one of the films of the first layer, and a third layer of one or more fibrillated films arranged in such manner that the extrusion and stretching of the films may be parallel with the one of the films of the first layer.

According to another aspect of the present invention, the above-described composite reticular structures are prepared by a process comprising the steps of:

feeding one or more fibrillated films, superposed to one another, to a trailing group;

feeding in perpendicular direction to the trailing group feed direction, one or more transversal fibrillated films;

cutting such transversal films in position corresponding to the edges of the underlying films;

causing the trailing group to jerkely move forward, in a direction parallel with the stretching axis of the underlying film or films by a length corresponding to the height of the transversal films;

repeating the feeding operation of the transversal fibrillated films as well as the cutting operation at each forward movement of the trailing group;

applicating onto the transversal films a further layer of fibrillated films parallelly arranged to the feed direction of the trailing group;

causing the cohesion of the composite structure so obtained.

The fibrillated films utilized as lower layer and as covering layer and the intermediate ones which are arranged perpendicularly to the former may have either the same or a different structure or composition.

The device for practising the process described hereinabove consists of:

(a) a trailing group for the fibrillated film;
(b) one or more reels for containing the fibrillated film, of the type with longitudinal unwinding and arranged at an end of the trailing group;
(c) one or more reels containing the transversal fibrillated film, arranged at one side of the trailing group;
(d) means for the insertion of the transversal fibrillated film arranged sidewards the trailing group and provided with a horizontal movement alternated with a movement perpendicular to the feed direction of the trailing group;
(e) cutting element for cutting the transversal fibrillated film, arranged on the same side of the trailing group, which the transversal fibrillated film reel is arranged and at the edge of said trailing group;
(f) a further reel for containing the fibrillated film with longitudinal unwinding, arranged at the other end of the trailing group;

(g) elements for causing the cohesion of the composite structure which are arranged at the outlet of the trailing group; and (h) cutting elements for cutting the sevages of the composite structure after cohesion.

The trailing group consists of a conveyor belt or, preferably, of two chains equipped with hooks, preferably crook-shaped, which engage the edges of the fed fibrillated film.

The insertion means for inserting the perpendicular or transversal film or films include a plurality of pliers arranged on a support capable of performing a horizontal and alternate movement in a direction perendicular to the feed direction of the trailing group. These insertion elements enable to carry out from 5 to 50 insertions per minute and preferably from 10 to 30 insertion/minute. The alternate movement can be imparted by a motor through a chain or through gears.

The cutting elements of the transversal films, perpendicularly arranged to the lower one or ones, preferably consist of a heated metal wire stretched on a support capable of performing a vertical alternate movement. The movement of the support is synchronized with that of the hooking element of the transversal film and occurs at every end of stroke of the latter elements. The cutting element includes furthermore a plate or frame having the function of placing the transversal fibrillated cut film onto the longitudinal base film.

The cohesion elements generally include one or more heated rollers between which the composite structure is inserted in order to compress and to fix the transversal intermediate fibrillated films between the upper and lower longitudinal films. Such cohesion-causing elements can include accessory devices for the spraying or impregnation of the article with glues, dressings, sizings and the like.

The cohesion can be also obtained by using other means which cause a spot bonding of the superposed films. The bonding spots are properly spaced from one another and serve to bind and therefore to cause the reciprocal cohesion of the various films which the retiform structures consist of. Binding can be obtained through localized melting, needled spots, localized bonding spots, etc.

The cutting elements of the selvages include blades or heated cutting metal discs.

The device is also equipped with one or more motors for the trailing group for the transversal film insertion elements and for the cutting elements, for the cohesion-causing elements etc., as well as with drives which synchronize the discontinuous step-movement of the trailing group with the movements of the insertion elements, of the cutting elements and of the cohesion-causing elements.

The constructive and functional characteristics of the device forming the object of the present invention as well as the process for producing the fibrillated composite structures can be better understood from the following detailed description in which reference is made to the figures of the attached drawing, which represent a preferred, exemplifying but not limitative embodiment of the present device, in which:

FIG. 1 is a schematic side view of the device object of the present invention; and FIG. 2 represents a schematic top view of the device of FIG. 1, with some parts in exploded view.

With reference to the figures, the device for the formation of reticular structures object of the present invention comprises a trailing group including a conveyor belt (1) consisting of two side chains (2) equipped with hooks which act on the edges of the fibrillated film and, in this way, trail it. The hooks are preferably crook-shaped in order to firmly hook the fibrillated film.

A metal or textile supporting belt may be arranged between the two side chains (2).

A motor (not shown) causes the motion of conveyor belt (1) discontinuously. A support for the fibrillated film reel (3) is arranged at an end of belt conveyor (1). The fibrillated film is unwound by reel (3) and placed onto conveyor belt (1) by means of a positioning roller (4). On one side of belt conveyor (1) there is arranged a second support for a fibrillated film reel (5) and on the same side, in position corresponding to the outer edge of chain (2), a cutting element (6) for the fibrillated film is arranged. The position of reel (5) is such that the extrusion and stretching direction of the wound fibrillated film is perpendicular to the one of the fibrillated film wound on reel (3). Insertion means (7) provides for the unwinding of the fibrillated film from reel (5) and for the arrangement thereof onto the film of reel (3), in a direction perpendicular to the feed direction of conveyor belt (1), when the latter stands still. Such insertion means (7) consists of one or more pliers arranged on a support capable of moving horizontally, alternately and perpendicularly to the forward movement of the conveyor belt. Such alternate movement is imparted by a motor driving an axis (8) on which a gearwheel (9) engaging a rack (10) integral with said support is keyed.

The pliers preferably consist of two metal plates reciprocally hinged on one side and equipped with an electrical opening and closing drive.

The insertion means (7) takes up the fibrillated film from reel (5) and, in its motion, trails is until placing it onto the fibrillated film unwound from reel (3) and lying on conveyor belt (1) when this stands still. The stroke of insertion means (7) is such as to transversally cover the fibrillated film conveyed by conveyor belt (1). At the end of stroke, the pliers of insertion means (7) open and release the fibrillated film which is cut by cutting elements (6). Insertion means (7) returns to the starting position, while conveyor belt (1) moves forward for a stretch corresponding to the height of the fibrillated film transversally arranged by insertion means (7).

According to a variant of the present process, the operation of inserting and cutting the transversal fibrillated film can take place while conveyor belt (1) is in motion, provided such operations occur while conveyor belt (1) is moving by a length equal to the width of the transversal film.

Cutting elements (6) comprise an electrically heated metal wire and a vertically moving plate or frame, having the function of lying the transversal fibrillated film onto the longitudinal fibrillated film. The metal wire and the plate or frame are fixed on a support vertically moved by a motor, when insertion means (7) is in the end of stroke position. One or more transversal superposed films can be arranged on the longitudinal film trailed by conveyor belt (1). To this purpose, belt conveyor (1) is retained for a time corresponding to the time necessary for the insertion means (7) to deposit a pre-established number of layers of transversal fibrillated films.

A second reel (11), placed at the other end of conveyor belt (1) lies, by means of a positioning roller (12), one or more fibrillated films onto the transversal films in a position parallel with that of the film unwound from reel (3). In such manner the transversal films are enclosed between two or more longitudinal films, with the respective stretching directions being perpendicular to one another.

At the outlet of conveyor belt (1) there are arranged cohesion elements (13) which include a heated roller or other known cohesion-causing means. Such cohesion elements (13) may also include devices for spraying and impregnating the reticular structure with glues, dressings, sizings and the like.

The cohesion elements (13) are followed by cutting elements (14) comprising blades, shears or heated cutting metal discs, arranged along the edges of the reticular structure and which perform the cutting of the selvages. At last, the reticular structure is wound up on a reel.

The process for producing reticular structures endowed with a high mechanical strength in both the longitudinal and the transversal directions, which is a further object of the present invention, comprises the following steps:

feeding to conveyor belt (1), through positioning rol (4), an open net of fibrillated film unwound from a reel (3);

forward movement of the net, laid onto conveyor belt (1) and hooked by the hooks of side chains (2), until supporting transversal insertion elements (7);

automatic or manual stop of the feed motion of conveyor belt (1);

transversal insertion of the fibrillated film net unwound from reel (5);

cutting and and placing the transversal net onto the longitudinal one by means of the action of cutting elements (6);

automatic or manual restarting of conveyor belt (1) for a longitudinal stretch equal to the width of the inserted transversal net;

placing, by means of a positioning roller (12), a second longitudinal net wound from reel (11) onto the longitudinal net/transversal net structure;

causing the cohesion of the manufactured articles through compression by means of rollers (13) or other spot welding means;

side cutting the selvages of the manufactured article by means of cutting elements (14), which have been heated to a temperature sufficient to melt the film and to cause, besides the cutting, the simultaneous welding of the article edges; and winding the reticular structure on a roller.

At each stop of conveyor belt (1) it is possible to insert one or more layers of superposed transversal fibrillated films. As an alternative it is possible to utilize more subsequent insertion stations of the transversal film, the motion of the various insertion means (7) being regulated as a function of the feed movement of conveyor belt (1). The subsequent insertion stations can be arranged also after roller (11) of the net of longitudinal fibrillated films. In all cases the last layer is always composed by longitudinal fibrillated films.

The speed of insertion elements (7) is such that 5 to 50 insertions of transversal fibrillated films per minute and preferably 10 to 30 insertions per minute can be carried out. The feed speed of conveyor belt (1) ranges from 10 to 100 m/minute.

The process forming the object of the present invention, which permits to obtain retiform structures with a balanced mechanical strength in the longitudinal and transversal directions, is employed for preparing reticular structures from fibrillated films, in particular from films based on polyolefins, such as crystalline polypropylene consisting of prevailingly isotactic macromolecules, high density as well as low density polyethylene, propylene/ethylene crystalline copolymers prevailingly containing propylene, of both the random and the block type, and mixtures thereof, optionally additioned with substances capable of promoting the adhesion of the nets to articles based on hydraulic binders, such as calcium carbonate and magnesium carbonate, cement, silica, oxides of alkaline metals and of alkaline-earth metals, zirconium compounds, and the like, as well as with stabilizers, lubricants, dyeing pigments, various fillers and the like.

The fibrillated films can be also prepared from other suitable plastic film-forming materials, such as styrene, acrylonitrile or vinyl chloride polymers and copolymers thereof. Partially crystalline polymers such as polyamides and polyesters can be utilized too.

For a better understanding of the present invention and for the embodiment of same, some illustrative but non-limitative examples are given hereinafter.

EXAMPLE 1

A net consisting of fibrillated films prepared from polypropylene additioned by 10% by weight of calcium carbonate and with 10% by weight of high density polyethylene was fed, by means of roller (4) to conveyor belt (1). The net consisted of 4 layers of fibrillated films having a weight of 25 g/m$^2$ and a width of 1.2 m, each layer having a thickness of 70 microns.

Conveyor belt (1) was caused to move forward until the net surpassed transversal insertion elements (7). Then, the feed of belt (1) stopped and, simultaneously, there was fed, in a direction perpendicular to the feed direction, a net consisting of fibrillated films prepared from polypropylene additioned with 10% by weight of calcium carbonate and 10% by weight of high density polyethylene, and comprising four layers of fibrillated films having a weight of 35 g/m$^2$ and a width of 1.2 m, each layer exhibiting a thickness of 70 microns.

The transversally inserted net was cut by the hot cutting wire of cutting elements (6) and placed by a plate onto the underlying net.

Conveyor belt (1) was started again for a longitudinal stretch equal to the width of the inserted transversal net.

Onto the longitudinal net/transversal net system, a second longitudinal net coming from reel (11) and having characteristics like those of the first longitudinal net, was deposited by roller (12).

The cohesion of the manufactured article was then obtained by causing the latter to pass on a roller (13) heated to 120° C., after spraying with a 15% aqueous emulsion of a vinyl acetate/vinyl alcohol (13:87) copolymer. At last, the article, after cohesion, was cut at the side selvages by cutting elements (14) heated to 200° C.

The article was wound at a speed of 20 m/minute. During the operation, 15 insertions/minute were accomplished.

The longitudinal and transversal fibrillated films exhibited a longitudinal tensile strength of 5 kg/5 cm and an elongation at break of 8%. The obtained reticular structure exhibited:

|  | In longitudinal direction | In transversal direction |
| --- | --- | --- |
| Tensile strength in Kg/5 cm. | 10 | 5 |
| Elongation at break in % | 8 | 8 |

EXAMPLE 2

Example 1 was repeated using, in the longitudinal direction, a net of fibrillated films having the same composition as the one of example 1 and consisting of six layers of fibrillated films weighing 33 g/m², each layer having a thickness of 60 microns and a width of 1.2 m. In the transversal direction there was utilized a net having the same composition as the one of example 1 and consisting of four layers of fibrillated films having a weight of 25 g/m² and a width of 1.2 m, each layer having a thickness of 70 microns.

The longitudinal fibrillated film exhibited a longitudinal tensile strength of 7 kg/5 cm and an elongation at break of 8%, while the transversal fibrillated film exhibited a longitudinal tensile strength of 5 kg/5 cm and an elongation at break of 8%.

The obtained reticular structure exhibited:

|  | In longitudinal direction | In transversal direction |
| --- | --- | --- |
| Tensile strength in kg/5 cm | 14 | 5 |
| Elongation at break in % | 8 | 8 |

EXAMPLE 3

Example 1 was repeated and to the manufactured article consisting of a first longitudinally arranged net of fibrillated films, of a second transversally arranged net of fibrillated films and of a third longitudinally arranged net there were added a fourth transversally arranged net of fibrillated films and a fifth longitudinally arranged net of fibrillated films.

The fourth net and the fifth net had the same composition and properties as the corresponding underlying nets.

The obtained reticular structure exhibited:

|  | In longitudinal direction | In transversal direction |
| --- | --- | --- |
| Tensile strength in kg/5 cm | 10 | 5 |
| Elongation at break in % | 8 | 8 |

What is claimed is:

1. A process for preparing a reticular structure consisting of fibrillated films and having a high mechanical strength both in the longitudinal and in the transversal directions, and consisting of a first layer of one or more longitudinal fibrillated films; of a second layer of one or more fibrillated films, which is superposed on the first layer and is arranged in such manner that the extrusion and stretch direction of the second layer is perpendicular to one of the film or films of the first layer; and of a third layer of one or more fibrillated films which is arranged in such manner that the extrusion and stretch direction of the films is parallel with the one of the films of the first layer, said method comprising the steps of:
   (a) feeding one or more fibrillated films, arranged one on the other, to a trailing group;
   (b) feeding, perpendicularly to the feed direction of the trailing group, one or more transversal fibrillated films;
   (c) cutting such transversal films in position corresponding to the edges of the lower films;
   (d) causing the trailing group to move forward stepwise, in a direction parallel to the stretch axis of the lower film or films, by a length corresponding to the height of the transversal films;
   (e) repeating the operation of feeding the transversal fibrillated films and of cutting them at each forward movement of the trailing group;
   (f) applying onto the transversal films a further layer of fibrillated films, arranged parallel to the direction of feed of the trailing group; and
   (g) causing the cohesion of the composite structure so obtained.

2. A process according to claim 1, in which the speed of feed of the trailing group ranges from 10 to 100 m/minute and from 5 to 50 insertions of transversal fibrillated films per minute are carried out.

3. A process according to claim 1, in which the speed of feed of the trailing group ranges from 10 to 100 m/minute and from 10 to 30 insertions of transversal fibrillated films per minute are carried out.

* * * * *